United States Patent
Traver et al.

[11] Patent Number: 6,145,294
[45] Date of Patent: Nov. 14, 2000

[54] LIQUID FUEL AND WATER INJECTION PURGE SYSTEM FOR A GAS TURBINE

[75] Inventors: Robert S. Traver; Robert J. Iasillo, both of Ballston Spa; Howard J. Kaplan, Clifton Park; John E. Drazba, Schenectady, all of N.Y.

[73] Assignee: General Electric Co., Schenectady, N.Y.

[21] Appl. No.: 09/057,494

[22] Filed: Apr. 9, 1998

[51] Int. Cl.[7] .................................. F02G 3/00; F02C 3/20
[52] U.S. Cl. .................. 60/39.02; 60/39.094; 60/39.463
[58] Field of Search ............................. 60/39.06, 39.094, 60/39.02, 39.463, 39.56

[56] References Cited

U.S. PATENT DOCUMENTS

| | | | |
|---|---|---|---|
| 3,344,602 | 10/1967 | Davies et al. | 60/39.094 |
| 4,041,695 | 8/1977 | Harper et al. . | |
| 5,720,164 | 2/1998 | Corbett et al. | 60/39.094 |
| 5,735,117 | 4/1998 | Toelle | 60/39.094 |
| 5,784,875 | 7/1998 | Statler | 60/39.463 |
| 5,966,926 | 10/1999 | Shekleton et al. | 60/39.094 |

FOREIGN PATENT DOCUMENTS

| | | | |
|---|---|---|---|
| 218466 | 1/1958 | Australia . | |
| 3916477 | 11/1990 | Germany | 60/39.094 |
| 60-104728 | 6/1985 | Japan . | |
| 159517 | 11/1990 | Japan | 60/39.094 |

OTHER PUBLICATIONS

Patent Abstracts of Japan, vol. 009, No. 252, Oct. 9, 1985 & JP 60 104728, Jun. 10, 1985.

*Primary Examiner*—Charles G. Freay
*Attorney, Agent, or Firm*—Nixon & Vanderhye

[57] ABSTRACT

A purge system is disclosed for flushing liquid fuel and water from the combustion section of a gas turbine system as well as for providing continuous cooling of the nozzles. The gas turbine may operate on liquid fuel or gaseous fuel. When the turbine is switched to burn gaseous fuel, the liquid fuel remaining in the liquid fuel system is flushed by a liquid fuel purge system. Similarly, water in the water injection system is purged from nozzles in the combustion system by a water purge system. The purge system operates in conjunction with an air atomization system, but does not rely on an atomizing air compressor to boost the pressure of the purge air. Instead, the purge system utilizes pressurized air from the gas turbine compressor and directs the purge air to manifolds which distribute air to the atomizing air passages, liquid fuel nozzles, and water injection nozzles via purge valves and soft purge valves.

8 Claims, 3 Drawing Sheets

LIQUID FUEL AND WATER INJECTION PURGE SYSTEM FOR A GAS TURBINE

FIELD OF INVENTION

The field of the invention relates to gas turbines, and, in particular but not limited, to liquid fuel injection systems for industrial gas turbines.

BACKGROUND

Industrial gas turbines often are capable of alternatively running on liquid and gaseous fuels. These gas turbines have fuel supply systems for both liquid and gas fuels, e.g., natural gas. The gas turbines generally do not burn both gas and liquid fuels at the same time. Rather, when the gas turbine burns liquid fuel, the gas fuel supply is turned off. Similarly, when the gas turbine burns gaseous fuel, the liquid fuel supply is turned off.

Gas turbines that burn liquid fuel systems require a liquid fuel purge system to clear the fuel nozzles in the combustors of liquid fuel. Similarly, a water purge system is required to purge the water injection system that is often used to add water to the combustion chamber when a gas turbine runs on liquid fuel. The water injection and the liquid fuel supply systems are generally turned off, when a gas turbine operates on gaseous fuel. When these systems are turned off, the purge systems operate to flush out any remaining liquid fuel or water from the nozzles of the combustor and provide continuous cooling air flow to the nozzles.

FIG. 1, shows schematically a gas turbine 100 having liquid fuel system 102 and a liquid fuel purge system 104. The gas turbine is also capable of running on a gas, such as natural gas, and includes a gaseous fuel system 106. Other major component parts of the gas turbine include a main compressor 108, a combustor 110, a turbine 112, and a controller 114. The power output of the gas turbine is a rotating turbine shaft 116, which may be coupled to, for example, a generator that produces electric power.

In the exemplary industrial gas turbine shown, the combustor may be an annular array of combustion cans 118, each of which having a liquid fuel nozzle 120 and a gas fuel nozzle 122. The combustor may alternatively be an annular chamber. In the combustion can arrangement shown in FIG. 1, combustion is initiated within the combustion cans at a point slightly downstream of the nozzles. Air from the compressor 108 flows around and through the combustion cans to provide oxygen for combustion. Moreover, water injection nozzles 111 are arranged within the combustor 110 to add energy to the hot combustion gases and to cool the combustion cans 118.

FIG. 3 shows a conventional purge systems for liquid fuel and water injection systems. The liquid fuel system 102 has an associated liquid fuel purge system 104, and a water injection system 124 and a water purge system 126. When the gas turbine 100 operates on natural gas (or other gaseous fuel), the liquid fuel purge and water purge systems 104, 126, blow compressed air through the liquid fuel and water injection systems and liquid fuel nozzles 120 to purge liquid fuel and water from the liquid fuel system 102 and water injection systems 124, respectively, providing continuous cooling air flow to the nozzles.

The air used to purge the liquid fuel and water injection systems is supplied air from a dedicated motor (M) controlled purge compressor 128. The purge compressor boosts the compression of air received from the main compressor 108. A compressor air pre-cooler 164, separator 166, and a filter arrangement 168 are used to treat the compressor air before it is boosted by the purge compressor. The purge air from the purge compressor is routed through piping 130, through temporary strainer 162, then to a tee 137 that splits the purge air flow and routes the flows to both the liquid fuel purge system 104 and water injection purge system 126. The tuning orifice 132 is used to meter the flow of purge air to the water injection purge air manifold 136 and nozzles 111, and the liquid fuel purge multiport valve 138. The liquid fuel purge multiport valve routes boosted pressure purge air to each of the liquid fuel nozzles 120. In addition, the purge compressor also provides air through another tuning orifice 133 to the atomizing air manifold 134 and to the atomizing air ports of the liquid fuel nozzles 120.

When the liquid fuel purge system 104 is initiated, a solenoid controlled soft purge valve 140 is open simultaneously with the multi-port valve 138 by a common solenoid valve 139. The soft purge valve 140 opening rate is mechanically controlled by a metering valve in an actuation line (not shown). The soft purge valve opens over a relatively long duration of time to minimize load transients resulting from the burning of residual liquid fuel blown out into the combustor from the purge system piping 142 and the liquid fuel nozzles. The soft purge valve 140 is a low flow rate valve, to reduce the boosted pressure purge air flowing from the purge compressors. After the soft purge valve has been opened a predetermined period of time, a high flow purge valve 144 is opened to allow the boosted purge air to flow at the proper system pressure ratio. The high flow purge valve may be a two-way ball valve 144.

When the water injection purge system 126 is initiated, a solenoid controlled three-way ball valve 146 is opened. The opening rate of this valve 146 is mechanically controlled by a metering, valve in the actuation line (not shown). The water injection valve 146 is slowly opened to minimize the risk that the boosted purge air will not cause a high flow of water to quench the combustion flame as the residual water is blown out of the purge system piping 148 and out of the water injection nozzles 111 in the combustion cans. The end cover check valves 147 prevent the backflow of liquids into the purge manifold 136 and multi-port valve 138.

The above-described piping, valves, purge compressor and other components of the purge systems for the liquid fuel and water injection systems are complicated and cumbersome. They require controlled opening of several valves, multiport valves, metering tuning orifices, check valves, all of which require maintenance and are possible failure points. If these purge systems fail, component failures will likely go undetected until turbine operation is ultimately affected, at which time the turbine must be taken off-line and serviced. To avoid having to take a gas turbine off-line due to a purge system failure, the conventional wisdom has been to add more purge system components and to add a backup system to the main purge system.

For example, if the purge compressor 128 fails, then air for the purge systems is supplied from an atomizing air compressor 150. Air from the atomizing air compressor is cooled in a purge air cooler 152. When the atomizing air compressor operates to provide air for the purge systems, then motor (M) operated valves 154, 156, are closed to reduce flow and pressure, then air is routed through the purge cooler at the appropriate pressure and temperature.

In addition, motor operated valve 158 is opened to provide a surge protection feedback loop. The operation of these valves 154, 156 and 158 controls the air flow to and from the atomizing air compressor 150.

Purge air from the atomizing air or purge air compressor passes through a temporary strainer 162 to remove contaminants from the purge air and protect the contaminant sensitive components from start up and commissioning debris. The purge cooler 152 is in addition to the precooler 164, separator 166 and filter 168 used to cool air from the main compressor 108 discharge.

The previously-described conventional liquid fuel and water injection purge systems have long suffered from several disadvantages and are prone to failure. For example, they require a purge compressor to boost the compressed air from the main compressor. To overcome the disadvantages of prior systems, the conventional wisdom has been to continually redesign the components of these purge systems, especially those components, e.g., check valves 147 and multi-port valve 138, that are prone to failure due to contaminants in the purge air.

The conventional control method has been to utilize a series of tuning orifices to balance the purge air and to set the appropriate pressure ratios for acceptable combustion dynamics. These tuning orifices have had to be individually sized to adjust the pressure ratios of the purge air.

Furthermore, the conventional purge systems require subsystems, such as a soft purge valve 140 with tuned needle valves, for initial application of purge air to the nozzles of the liquid fuel system. The soft purge valve was added to minimize transient load spikes during fuel transfers when the purge systems are started. The water injection purge valve actuation system was also modified to include a three way ball valve 146, with tuned needle valve, to reduce the risk of a combustion flame out.

With the addition of purge compressors, backup systems for the purge compressors, tuning orifices, temporary strainers, subsystems and other new components, instrumentation had to be added to protect the new components against contamination. Also, a recirculation line 170 was added around the atomizing air compressor for surge protection. These fixes to the purge systems were marginally acceptable. The conventional purge air systems, with all of their fixes and new components, were complex, delicate and not adequately reliable.

SUMMARY OF THE INVENTION

Applicants designed a novel and unobvious purge system for a gas turbine that does not require purge compressor. Moreover, applicants' purge system is simple, robust, reliable and cost effective. The inventive system provides a continuous and reliable flow of purge air to flush the nozzles for liquid fuel and water injection free of liquids, and to cool the nozzles. In addition, the purge systems prevent backflow of hot combustion products into the liquid fuel and water injection systems, when those fuel and water injection systems are turned off. Furthermore, when the fuel and water injection systems are on, they are isolated from the purge systems to prevent accumulation of fuel and water liquids in the purge systems.

The inventive purge system uses lower pressure air from the main compressor 108 discharge and does not require a separate purge compressor to boost the pressure of the purge air while the gas turbine operates on gas fuel. The main compressor is inherently reliable, at least in the sense that the gas turbine cannot operate when the main compressor is inoperable. In addition, the atomizing air compressor is not needed as a back-up boost pressure system while the gas turbine is on gas fuel.

To accommodate the lower pressure purge air, applicants increased the diameter of the purge air piping to allow for greater purge air flow volume. In addition, the present purge system includes a purge manifold to distribute purge air to the liquid fuel nozzles, such that the manifold replaces the complex multi-port poppet valve 138 used on conventional purge systems. Moreover, the present purge system uses pneumatically actuated ball valves, instead of multi-port valve and check valves. The prior poppet-type multi-port valve 138 and check valves 147 were adversely affected by contaminants in the purge air, and even though filtered, were still prone to failure.

Other novel features of the present invention include true block-and-bleed capability which provides double valve isolation with an inter-cavity vent for improved reliability, and a single point tuning control valve 212 that allows adjustments to be easily made to the pressure ratio required for minimum combustion dynamics. In is addition, the present purge system includes an improved purge control system operated by controller 114. The controller utilizes additional instrumentation 266, 267, 268 that continuously monitors the purge system pressure ratios to prevent fuel nozzle failures due to loss or reduction of purge flow, and to provide better control during purge initiation after fuel and water injection transfers.

The present invention provides enhanced control of the introduction of purge air into the nozzles liquid fuel and water injection systems, with the benefit of minimizing undesired effects of flushing the nozzles of the remaining liquid. Such undesired effects include flushing too quickly the excess fuel in the nozzles into the combustor where the fuel burns causing an undesired power transient in the gas turbine output. In more general terms, if the purge air flow rate is too great when the gas turbine is burning a gaseous fuel, the combustors may temporarily introduce too much fuel, which would result in high dynamics of the gas turbine or lower combustion stability during the transient.

Applicants' purge systems have sufficient control to properly meter the flow of purge air into the liquid fuel and water injection nozzles. Accordingly, the present invention avoids or minimizes several problems that have persisted in the conventional purge systems. For example, the present invention minimizes damage to the combustion liquid fuel nozzles due to back-flow of hot combustion gases, which previously occurred immediately after the liquid fuel turned off. The present invention also minimizes damage to the combustion fuel nozzles and/or water injection nozzles due to coking of the liquid fuel. Coking, if it were to occur, could block the fuel nozzles, disrupt the fuel flow and limit the gas turbine's ability to burn liquid fuel.

The present invention provides the relatively large volume of purge air initially needed to flush out the nozzles, but does not provide excessive or inadequate amounts of purge air. Accordingly the present invention avoids prior problems such as introducing purge air too forcefully into the fuel nozzles, such that large amounts of liquid fuel are ejected into the combustors or too much air blasts out of those nozzles. These problems resulted in the turbine having to suffer large load transients or the combustors had a tendency to flame out which can cause the turbine to trip off.

The enhanced controls provided by the present invention also provide good isolation of the purge systems from the liquid fuel and water injection systems, when those systems are providing liquid fuel and water to the combustors. Good isolation ensures that the purge system does not partially back fill with liquid fuels or water. If liquids filled the purge systems, they could coke the purge systems. Excess liquid fuel in the purge system would be blown back through the fuel nozzles the next time the liquid fuel system was stopped and the purge system started. The liquid fuel back filled in the purge system could result in undesired fuel burning and transient power spikes in the operation of the turbine.

The on-line tunability of the present invention is beneficial also because it avoids the previous re-calculation of orifice sizes in the field tuning to meet pressure ratio requirements. The invention also eliminates field tuning of needle metering valves to control the opening rates of the purge valves to minimize purge introduction effects.

The new system utilizes a smart, simple and robust design with reliable components and independent control of the components. The new system design should improve overall plant efficiency through elimination of operation of the motor driven booster compressor and improve plant operability by reducing forced outages resulting from purge system failures.

Applicants' purge system offers greater reliability than prior purge systems because applicants have eliminated complex and unreliable components, and replaced them with more robust components. Applicants' system is also less sensitive to contamination than prior purge systems, due to the self-cleaning nature of ball-type valves. Accordingly, the invention should have fewer component and system failures and lower operating and maintenance costs for the customer.

The invention also reduces combustion dynamics by better purge pressure ratio control, which reduces fatigue wear on the combustion system. Similarly, the invention improves transient control in combustion system which results in lower load spikes when the purge system starts purging liquid fuel from the combustor and liquid fuel system. Furthermore, because the invention provides improved combustion transient control, the risk of combustion flame out is reduced as the water injection is purged by the compressed air purge systems. These advantages and benefits and more are believed to result from the present invention.

DETAILED DESCRIPTION OF THE DRAWINGS

Figure 1:
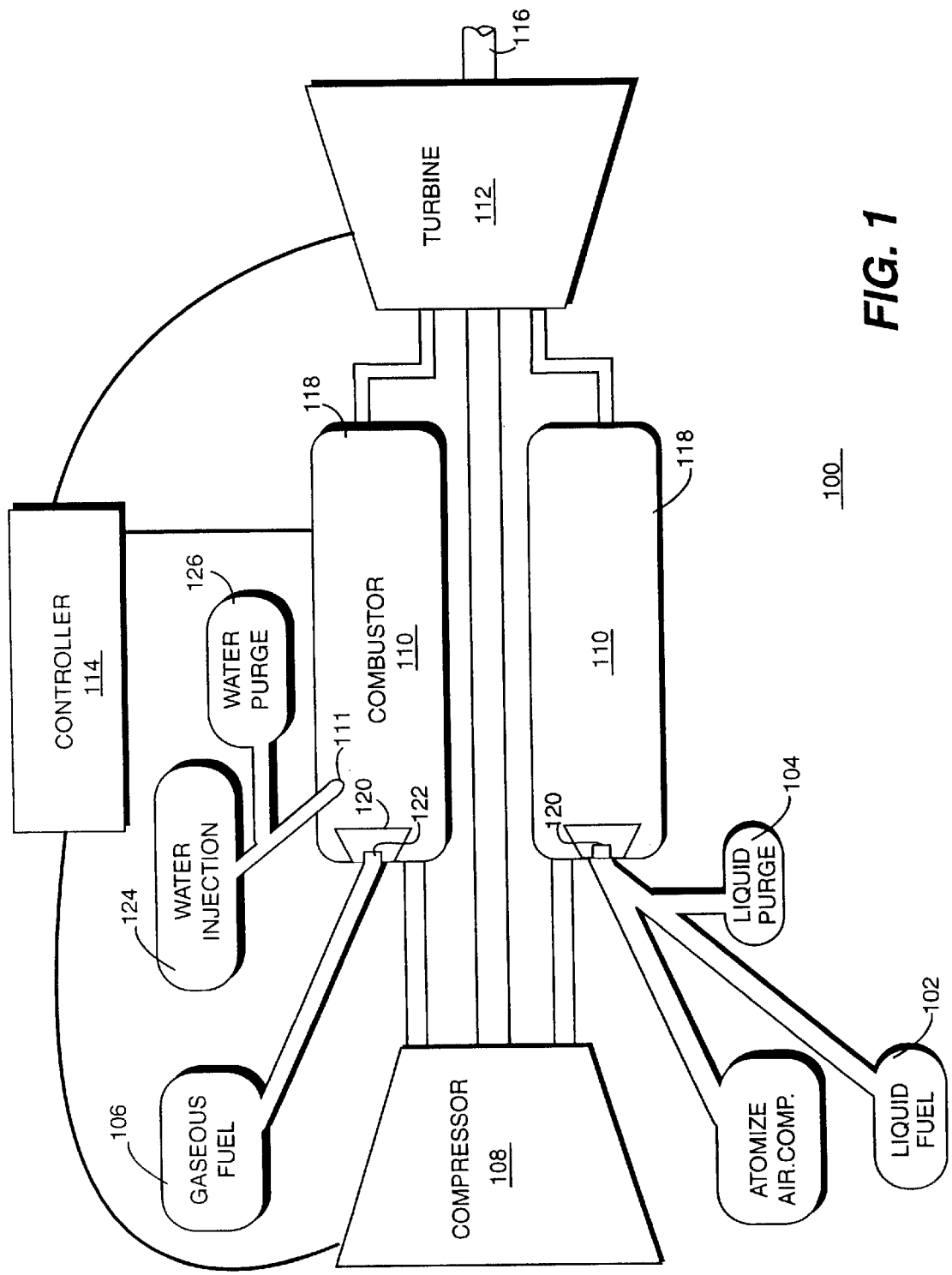
FIG. 1 is a schematic diagram of an exemplary gas turbine having liquid fuel and water injection purge systems.
Figure 2:
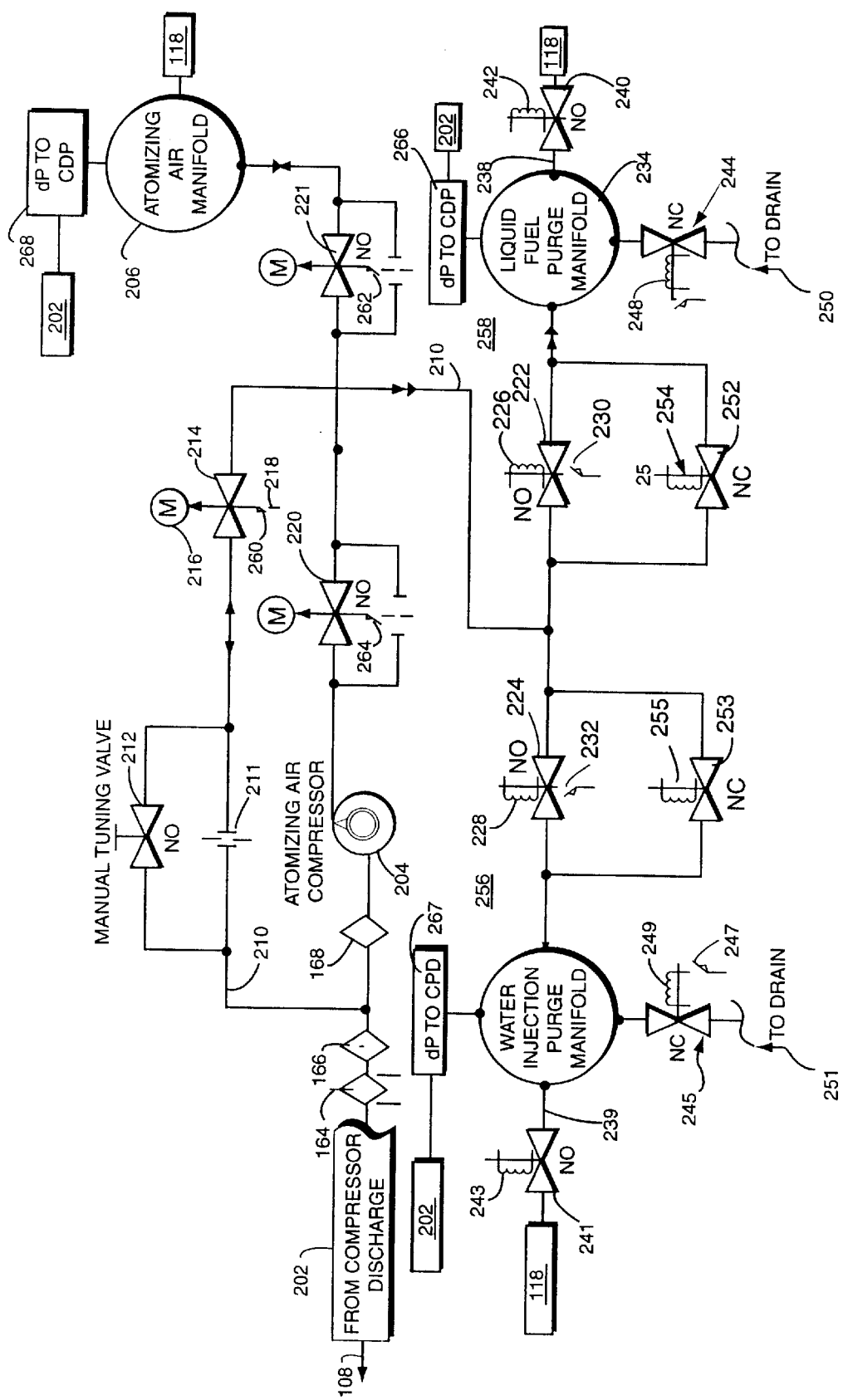
FIG. 2 is a diagram showing schematically a preferred embodiment of the present invention of purge systems for liquid fuel and water injection systems.
Figure 3:
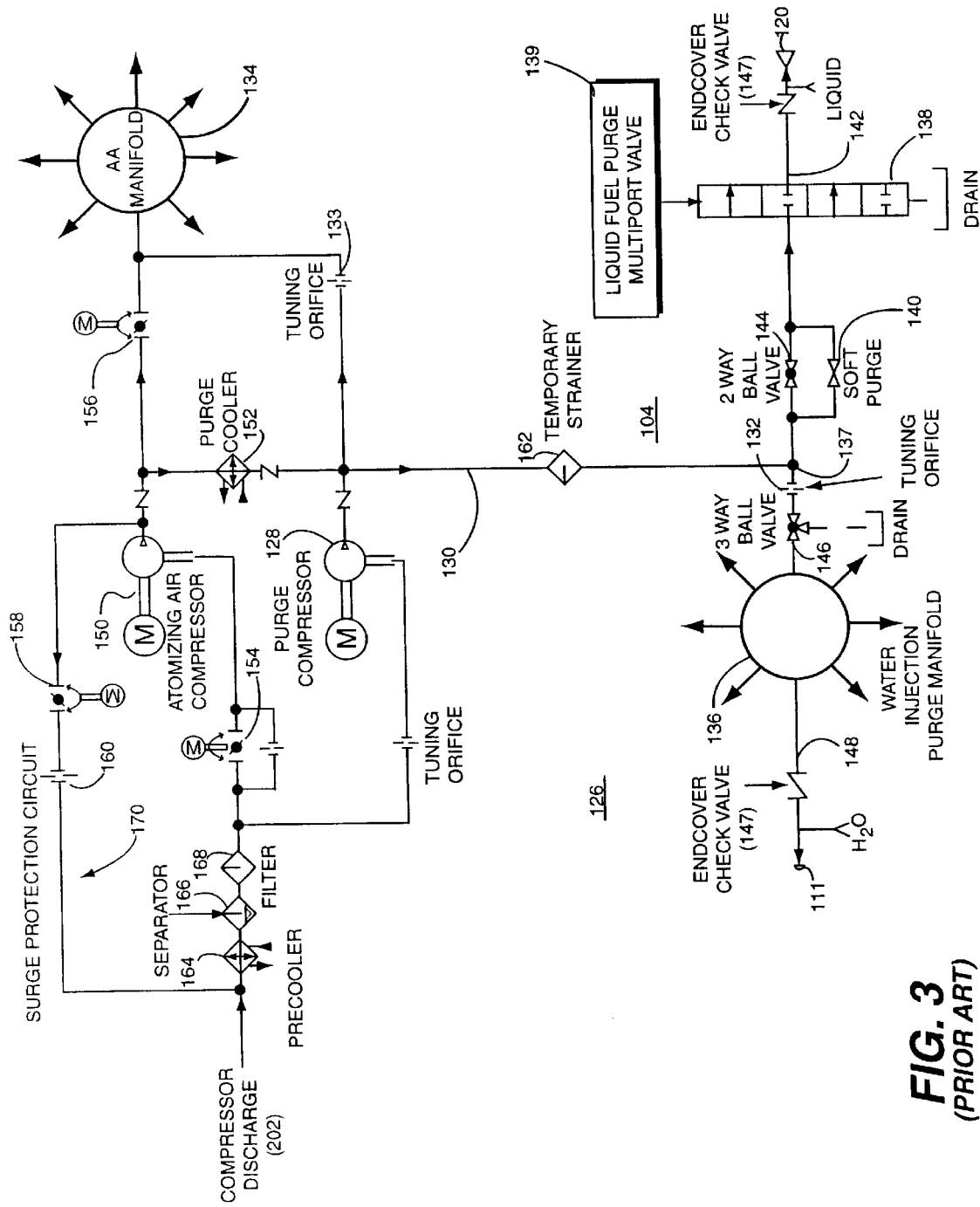
FIG. 3 is a diagram showing schematically a conventional liquid fuel and water injection purge system.

FIG. 2 shows an exemplary purge system that embodies the present invention and which can be implemented on the gas turbine system shown in FIG. 1. The purge system receives cooled and filtered air from a compressor discharge port 202 of the main compressor 108, the atomizing air precooler 164, and moisture separator 166. An atomizing air compressor bypass line 210 provides compressor discharge air for the purge system. The by-pass line may include a manual tuning valve 212 and a restriction orifice 211 that provides manual control over the pressure and flow rate of the compressor discharge air being supplied as purge air to the purge system. The pressure of the purge air is no greater than the pressure of the compressor air from port 202, because the purge system does not require a booster purge compressor. A motor (M) actuated bypass valve 214 is powered by a motor 216 and operated by controller 114, where switch 218 provides position feedback.

The compressor discharge 202 used by the purge system is shared with the atomizing air compressor 204 that supplies boosted atomizing air to the liquid fuel nozzles via an atomizing air manifold 206 and to the atomizing air ports of the liquid fuel nozzles. The atomizing air compressor and, in particular, the pressure ratio for atomizing air, are controlled by motor operated valves 214, 220, and 221 that are operated by controller 114. The atomizing air assists in breaking up the flow of liquid fuel into an atomized mist that is most efficiently and quickly burned. The atomizing air compressor is not needed when the gas turbine burns a gaseous fuel, because the gaseous fuel is naturally in a gaseous state and does not need to be atomized. The atomizing air pressure ratio is controlled by valves 220, 221, the operation of the valves controls the atomizing air system pressure during transient conditions.

While the gas turbine burns gaseous fuel, the compressor discharge air 202 bypasses the inactive atomizing air compressor since the motorized valve 220 has been closed and the motor actuated bypass valve 214 has been opened. The main controller 114 operates both of the motor actuated valves 214, 220.

The main compressor discharge 202 is an inherently reliable air source. Purge air flows through the bypass line 210 to the main purge feed valves 222, 224 for purging the liquid fuel and water injection systems, respectively. These main feed valves are normally open, with the amount of purge air flowing through the valves depending on the settings of the main bypass valve 214 and the atomizing air valve 220. The flow of purge air starts when valve 214 is opened, such as during a transition from burning liquid fuel to gaseous fuel in the combustor.

Online adjustment of the purge pressure ratio is provided by a manual tuning valve 212 that can be manually closed to restrict and is adjust the purge flow with the purge systems online. Because the purge flow can be controlled online, the mechanical components of the purge system may be designed with a generous flow margin above the specific flow margin to which the system is designed. During operation of the purge system, the manual flow valve 212 can be tuned down to a precise purge flow to minimize any adverse combustion effects, such as on combustion dynamics or flame stability.

The purge feed valves 222, 224 are controlled with solenoid valves 226, 228, respectively. When these solenoid valves are actuated by controller 114, the actuating air is used to actuate the purge feed valves 222, 224, with limit switches 230, 232 monitoring the positions of the valves 222, 224.

Downstream of the purge feed valves 222, 224, are the purge manifold 234 for the liquid fuel system and nozzles and the purge manifold 236 for the water injection system and nozzles. The manifolds 234, 236 distribute the purge air to each of the fuel and water injection nozzles in each combustion can 118 and nozzles 120. To prevent backflow of fuel and water into the purge system, each purge line 238, 239 is equipped, respectively, with a (normally open) pneumatically-actuated isolation valve 240 and 241.

There is a pair (for liquid fuel and water injection) of purge lines and associated isolation valves 240 and 241 for each combustion can 118 in the combustion system of the gas turbine. The purge lines 238, 239 extend from their respective purge manifolds 234, 236 to the combustion can 118 where nozzles 120 are located. The isolation valves 240 and 241 are low pressure loss valves which are much less sensitive to contamination than are the previous poppet valve and check valves they replace.

A pair of solenoid valves 242 and 243 for manifolds 234, 236 provides the actuation air to all of the isolation valves 240 and 241 associated with its respective manifold. In addition, the manifolds are equipped with (normally closed) small drain valves 244 and 245, with a limit switch 246 and 247 that monitors and limits the position of the drain valves. The drain valves are controlled by solenoids 248 and 249 which are operated by controller 114. The drain valves 244 and 245 have discharge lines 250 and 251 leading to a vented waste tank as a bleed point for purge air and contaminants in the system.

Soft purge functions are provided by (normally closed) small, low flow feed valves 252 and 253 associated with each manifold 234, 236, and that are in parallel to main purge feed valves 222, 224. These soft purge feed valves 252, 253 are operated by a solenoids 254 and 255 for soft purge flow introduction, under the control of controller 114.

The small soft purge feed valves 252 and 253 restrict the flow of purge air to the liquid fuel manifold and fuel nozzles during the initiation phase of purging the liquid fuel system. The soft purge feed valve slowly meters the introduction of purge air to the fuel nozzles to avoid too strongly flushing liquid fuel out of the nozzles and into the combustion cans in order to minimize transient power surges in the turbine and to reduce the risk of combustion flame out. The independently controlled components of the double block-and-bleed system provide greater flexibility in all aspects of purge system operation, than was available in prior systems.

The compressor discharge air from discharge port 202 is fed through the pressure ratio control valve 221 to feed the atomizing air manifold 206 which directs air to the combustion cans 118 into the liquid fuel nozzles 120.

While the gas turbine burns liquid fuel, compressor discharge air from port 202 is supplied to the atomizing air compressor 204, and the purge system is closed off by the motor actuated bypass valve 214. The atomizing air pressure is boosted by the atomizing air compressor 204 to provide better atomization of the liquid fuel in the combustion can 118. The atomizing air passes through the pressure ratio control valves 220, 221, and is routed to atomizing air manifold 206 which distributes atomizing air to the combustion cans 118 and the atomizing air ports of the liquid fuel nozzles 120.

When liquid fuel is flowing to the combustion system of the gas turbine, the purge system 258 is inoperative, and the isolation valves 240 for each combustion can are closed to prevent backflow of fuel into the purge system. During liquid fuel operation, the main purge feed valve 222 for the liquid fuel purge system 258, is also closed and the drain valve 244 is open to allow any purge air or fuel leakage that reaches the liquid fuel manifold to drain out of the gas turbine.

The water injection purge system 256 is in operation until water injection flow is called for. Similarly, the water injection purge system 256 has isolation valves 241 for each combustion can 118 that are coupled to the water injection purge manifold 236. The water injection isolation valves are closed when the water injection stop valve (not shown) opens. Water injection in the combustion cans allows water to flow to the combustion system to reduce emissions during the burning of liquid fuel. When water is injected into the combustion cans 118, the purge system isolation valves 241 are closed to prevent backflow of water into the purge system 256. The main purge feed valve 224 is also closed and the drain valve 245 is open to allow any water or purge air leakage to drain.

Water injection to the combustor may be turned off when the gas turbine is operating at high loads and while burning liquid fuel. Because the water injection system is turned off, the water purge system 256 is started, but the liquid fuel purge system 258 remains off. Moreover, the water injection purge system 256 operates in this circumstance, while the atomizing air compressor 204 continues to provide atomizing air for the burning of liquid fuel.

To run the atomizing air compressor 204 simultaneously with the water purge system 256, back pressure is applied to the atomizing air compressor 204 by closing valve 221 to operate in a safe envelope on the compressor curve while the water injection purge system is on.

The atomizing air pressure ratio valve 220 is open during liquid fuel operation, and closed during gas fuel operation. When a gas turbine transitions from liquid to gas fuel operation, the atomizing air compressor 204 is left on for a short period of time. Valve 220 is closed as the liquid fuel purge system 258 is initiated to reduce the purge air pressure during the soft purge introduction through the small feed valve 252. The atomizing air pressure ratio valve 220 is opened again for a short period to provide high pressure and flow to scavenge clear the liquid fuel nozzles. The valve 220 is then closed again prior to turning off the atomizing air compressor 204.

For startup reliability, the atomizing air compressor bypass valve 214 and the atomizing air pressure ratio valves 220, 221 have both closed and open position switches 260, 264, 262, respectively. These switches are used for startup position confirmation as pressure ratio detection is not reliable at the time of startup due to very low compressor discharge pressures. At other times, the position switches 260, 262, 264 serve to provide an alarm indication to controller 114.

The purge air pressure is monitored in the purge systems at the manifolds 234, 236, 206, for the liquid fuel purge, the water injection purge and the atomizing air. The pressure in these manifolds is monitored by comparing the compressor discharge pressure at port 202 with the pressure in the manifold. Delta pressure transducers 266 and 267 are connected to the manifolds are used by the controller 114 to calculate a pressure ratio relative to the compressor discharge pressure. An alarm is provided in the event the ratio falls below a preset limit, and there is an action taken if the ratio falls farther below a preset limit. A possible action will be to take the gas turbine off line to protect the nozzles. The delta pressure transducers attached to the manifolds 234, 236 for the purge systems 258, 256 also track the manifold pressures to control the operation of the soft purge valves 252 and 253 and soft purge operation during purge startup. The controller 114 opens the valves 252 or 253 when the pressure ratio is at a pre-set low level.

Applicants have conducted tests on the above-described purge systems which demonstrated that the system is robust, well balanced and delivered proper purge pressure ratios and pressure ratio balance across the liquid fuel and water injection purge systems, and the atomizing air system. In addition, testing has established that the present invention has substantially reduced combustion dynamics and load transient spikes during fuel transfers, below the levels with prior purge systems. In addition, temperature spread data from tests demonstrate the risk of combustion flame out during a water injection to purge transfer was substantially minimized. Accordingly, the present invention provides an improved liquid fuel and water injection purge system for a gas turbine.

The invention has been described in connection with the best mode now know to the inventors. The invention is not to be limited to the disclosed embodiment. Rather, the invention covers all of various modifications and equivalent arrangements included within the spirit and scope of the appended claims.

What is claimed is:

1. In a gas turbine having a main compressor, a combustor and a turbine, a liquid fuel supply selectively coupled to provide liquid fuel to the combustor, a liquid fuel purge manifold, a gaseous fuel supply selectively coupled to provide gaseous fuel to the combustor, a purge system comprising:

a coupling to a discharge port of the main compressor;

conduits between the discharge port and the manifold which apply air from the compressor as purge air to the liquid fuel purge manifold at a pressure level at or below a pressure level of the compressor air at the discharge port.

2. In a gas turbine as in claim 1 wherein the purge system further comprises a solenoid operated main purge feed valve upstream of the manifold.

3. In a gas turbine as in claim 2 wherein the purge system further comprises a soft purge valve in parallel with the main purge feed valve.

4. In a gas turbine having a main compressor, a combustor and a turbine, a purge system comprising:

a coupling to a discharge port of the main compressor;

conduits between the discharge port and a manifold which applies purge air to the combustor at a pressure level at or below a pressure level of compressor air at the discharge port, and a liquid fuel purge system, and a water injection purge system separately operable to said liquid fuel purge system.

5. In a gas turbine having a main compressor, a combustor and a turbine, an atomization air compressor supplying air to a purge system, wherein the purge system comprises:

a coupling to a discharge port of the main compressor;

conduits between the discharge port and a manifold which applies purge air to the combustor at a pressure level at or below a pressure level of compressor air at the discharge port;

a motor actuated bypass valve, and a bypass line which circumvents the atomization air compressor.

6. In a gas turbine as in claim 5 wherein the purge system further includes a manual tuning valve in the bypass line and in series with the motor actuated bypass valve.

7. A method for purging a gas turbine having a main compressor providing compressed air to a combustor which generates hot gases to drive a turbine, and wherein the combustor is fueled alternatively by a liquid fuel system and a gaseous fuel system, wherein the method comprises the steps of:

a. supplying liquid fuel to the combustor and burning the liquid fuel to generate the hot combustion gases;

b. switching from supplying liquid fuel to gaseous fuel to the combustor and burning the gaseous fuel to generate the hot combustion gases;

c. purging liquid fuel from the liquid fuel system by directing compressor air from the compressor through a nozzle portion of the liquid fuel system, where the compressor air is at a pressure no greater than a pressure of the compressor air when discharged by the compressor.

8. A method for purging a gas turbine as in claim 7 further comprising the step (d) of purging water from a water injection system coupled to the combustor by directing compressor air from the compressor through a water injection nozzle in the combustor, where the compressor air is at a pressure no greater than a pressure of the compressor air when discharged by the compressor.

* * * * *